Sept. 29, 1953     R. H. DICKSON     2,653,831

REPAIR SERVICE MANIFOLDING SET

Filed May 23, 1950     3 Sheets-Sheet 1

INVENTOR.
Roy H. Dickson
BY
Evans & McCoy
ATTORNEYS

Sept. 29, 1953  R. H. DICKSON  2,653,831
REPAIR SERVICE MANIFOLDING SET
Filed May 23, 1950  3 Sheets-Sheet 2

INVENTOR.
Roy H. Dickson
BY
Evans & McCoy
ATTORNEYS

INVENTOR.
Roy H. Dickson
BY Evans & McCoy
ATTORNEYS

Patented Sept. 29, 1953

2,653,831

UNITED STATES PATENT OFFICE 2,653,831

REPAIR SERVICE MANIFOLDING SET

Roy H. Dickson, Cleveland, Ohio, assignor to Control Forms, Inc., Cleveland, Ohio, a corporation of Ohio Application May 23, 1950, Serial No. 163,770

3 Claims. (Cl. 282—23)

This invention relates to manifolding sets and more particularly to a manifolding set designed to meet the needs of concerns operating a repair service, and particularly to concerns such as cleaning and dyeing establishments.

The manifolding set of the present invention includes a master record sheet which is adapted to receive all entries needed to provide a complete record of each job including the date or dates of delivery.

The set also includes a number of other record sheets and detachable stubs which may be used to provide a convenient check on the progress of the work on a given order so that undue delay in the completion of any job is easily discoverable.

Certain auxiliary record sheets and associated stubs are interrelated in such manner that they may be used to check on deliveries and collections and finally are of assistance in making the final entries on the master record sheet.

Certain of the auxiliary record sheets and stubs, after separation from the master record sheet, may be placed in temporary files where they provide a convenient means for checking on the amount of work done in any day in any department of the plant, and for ascertaining at any time the number of articles that await processing in each department.

Objects of the invention are to provide a simple and effective means for maintaining a continuous check on cash and inventory, to reduce bookkeeping costs, to reduce bookkeeping errors, and to reduce losses due to misplacement of articles.

More specifically the invention aims to provide a convenient means for keeping track of individual jobs to prevent undue delays, to provide a convenient means for ascertaining the amount of work on hand in any department, to provide an accurate check on cash collections by delivery men, and to reduce mistakes in charges.

With the above and other objects in view, the invention may be said to comprise the manifolding set as illustrated in the accompanying drawings and hereinafter described, together with such variations and modifications thereof as will be apparent to one skilled in the art to which the invention pertains.

Reference should be had to the accompanying drawings forming a part of this specification, in which.

Figure 5:
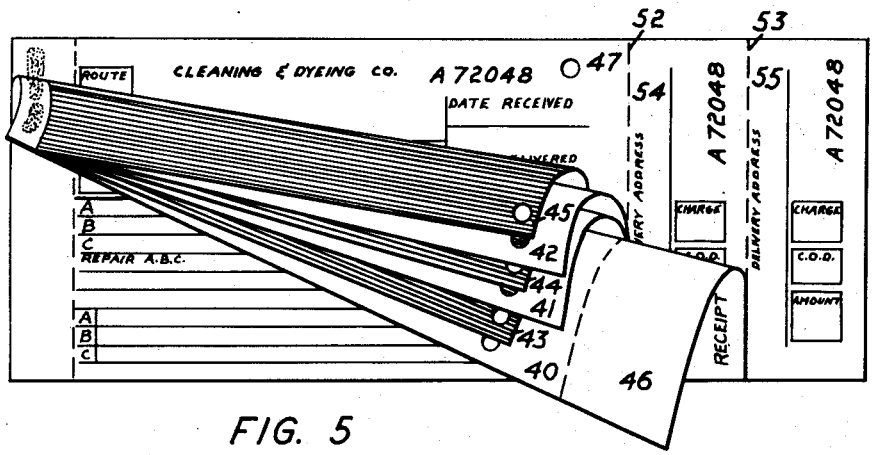
Figure 6:
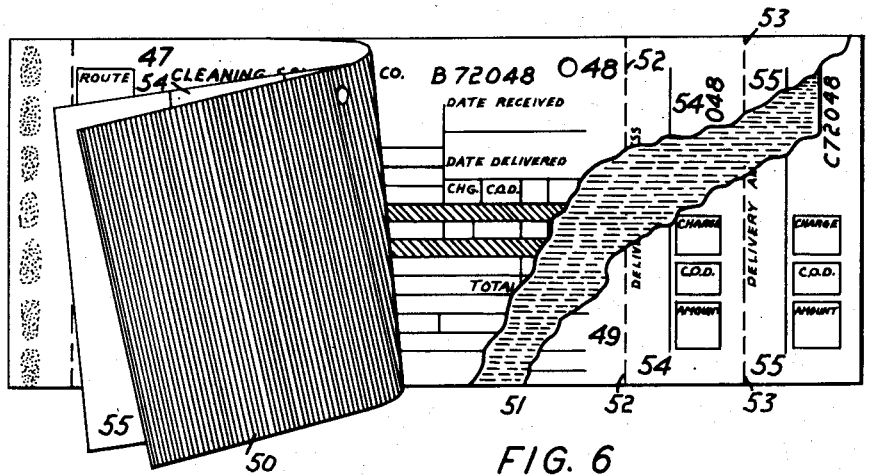

Fig. 5 is a plan view of a manifolding set of slightly modified construction, showing the top group of sheets partly turned back and partially detached from the bottom set; and Fig. 6 is a plan view of the bottom group of record and transfer sheets employed in the manifolding set shown in Fig. 5, the top record sheet and its associated transfer sheet being turned back and the second record sheet being partially broken away to show the transfer sheet and record sheet beneath it.

The manifolding set of the present invention is composed of a series of record sheets and interposed transfer sheets that are bound together at one end so that all of the sheets are originally in manifolding relation to receive the original entries. The set is composed of two groups of record and transfer sheets which can be separated after the initial entries have been made to provide two separate groups of sheets, each composed of record sheets and transfer sheets in manifolding relation.

Figure 1:
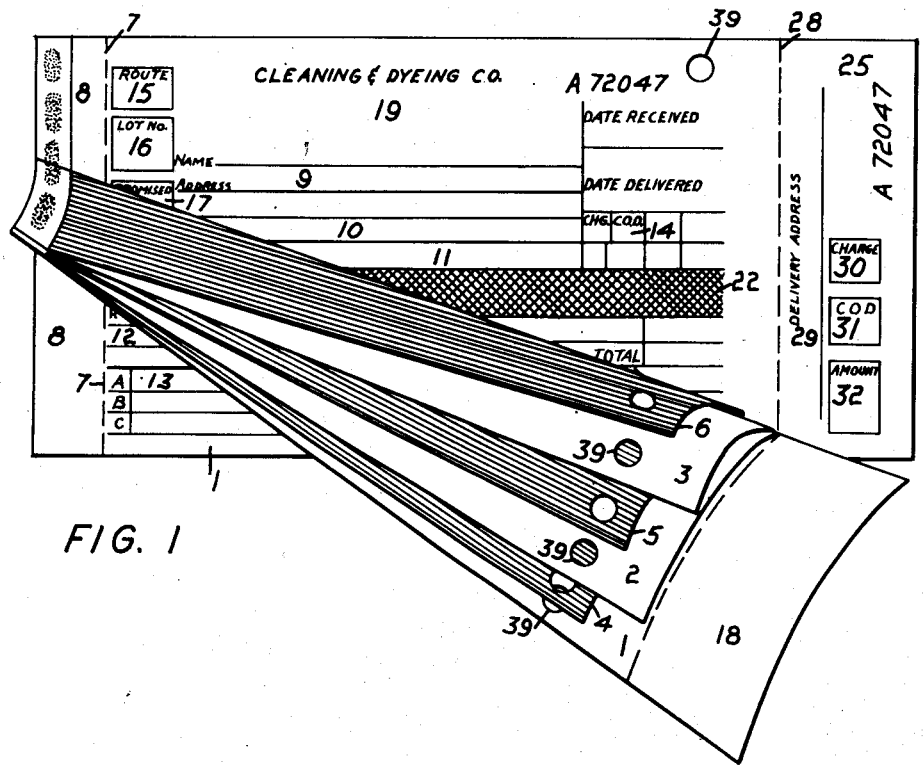
Figure 1 is a plan view of a manifolding set embodying the invention, showing a number of sheets forming a top group of record and transfer sheets partly turned back and partially detached from the bottom group.
Figure 2:
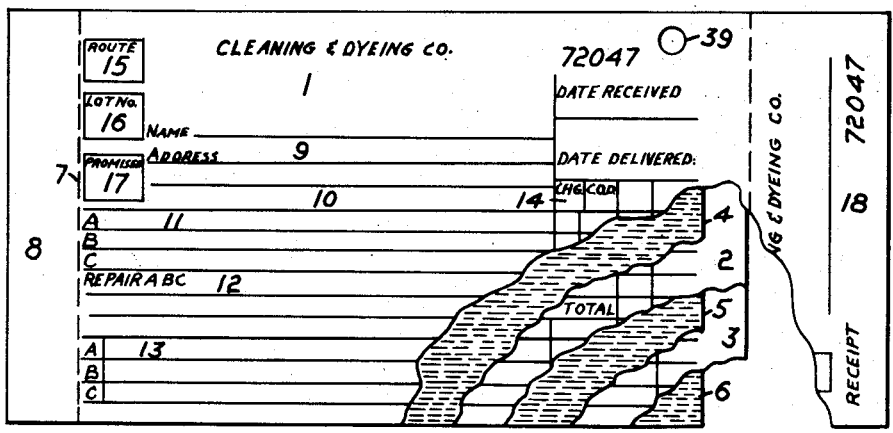
Fig. 2 is a plan view of the top group of record and transfer sheets with portions of the sheets broken away to show the arrangement of the record and transfer sheets.

As shown in Figs. 1 and 2 of the drawings, the manifolding set has a top sheet I which serves as a master record sheet which is adapted to serve as a permanent record after the job has been completed. The top group of sheets, which is adapted to be separated from the remaining sheets of the set, consists of a master record sheet I, duplicate record sheets 2 and 3, and transfer sheets 4, 5 and 6 disposed beneath the record sheets I, 2 and 3. Each of the record sheets of the set is provided with a tear line 7 adjacent the attached ends of the sheets, permitting each of the record sheets to be detached from the set and providing each record sheet with a stub 8 which is bound to the transfer sheets. The transfer sheet 6 is lightly glued to the stub 8 of the record sheet beneath it, so that the top group of sheets consisting of the sheets 1 to 6 inclusive can be detached from the lower group of sheets, the record sheets and transfer sheets of both groups remaining in manifolding relation. The detachment of the top group of sheets from the bottom group is simplified by reason of the fact that the sheets of the bottom group are longer than the sheets of the top group and project beyond the same.

The master record sheet 1 is provided with a space 9 in which the customer's name and address may be written and beneath the space 9 there is provided a space 10 in which a delivery address may be written if the articles are to be delivered to an address other than that recorded in space 9. Below the space 10 there is provided a space 11 subdivided by horizontal lines to provide spaces designated by the printed letters A, B and C, in which articles to be processed may be listed. Below the space 11 are spaces 12 and 13 in which various notations may be made with respect to the articles listed in spaces A, B and C and with respect to operations to be performed on such articles.

The sheet 1 is also provided with a space 14 to receive receipt and delivery dates and charge or C. O. D. notations. Spaces 15, 16 and 17 are provided for indicating the particular route from which the goods are received, the lot number and the promised date of delivery, the space 16 being used in cases where a considerable number of articles are included in the order, making it desirable to use more than one manifolding set to itemize them.

The record sheet 1 is preferably provided with a detachable receipt stub 18 at its free end, which is made detachable from the body of the sheet by means of a transverse tear line. The transfer sheets 4, 5 and 6 are preferably shorter than the body of the record sheet 1, terminating short of the free ends of the record sheets to facilitate detachment of the record sheets.

The bottom group of sheets includes a top record sheet 19 and duplicate record sheets 20 and 21. All of the record sheets have the same printed matter thereon, indicating the various data receiving spaces, but the record sheets of the bottom group differ from the record sheets of the top group in that the spaces thereof which underlie the space 11 of the master record sheet have darkened areas so disposed that the record sheet 19 has a clear space to receive the notation in space A only, the record sheet 20 to receive the notation in space B only, and the sheet 21 to receive the notation in space C only.

Figure 3:
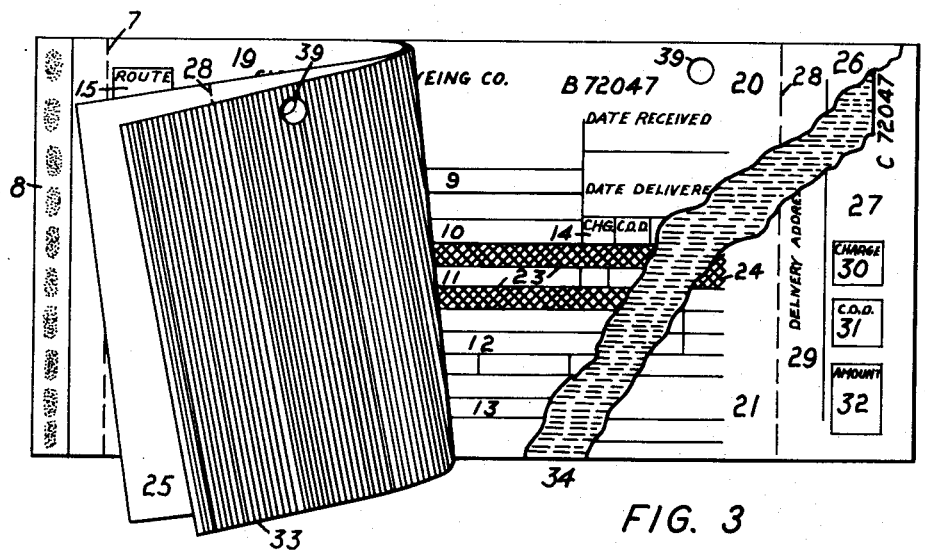
Fig. 3 is a plan view of the bottom group of sheets of each set with one record sheet and one transfer sheet partly turned back and a portion of the second transfer sheet of the group partially broken away to show the transfer sheet and record sheets beneath it.

As shown in Fig. 1, the sheet 19 has a darkened area 22 that underlies the spaces B and C of the master record sheet and, as shown in Fig. 3, the sheet 20 has darkened areas 22 blocking off the spaces A and C, while the bottom record sheet 21 has a darkened area 24 that blocks off the spaces A and B. The items written in space A appear on record sheet 19, the items written in space B on record sheet 20, and the items written in space C on record sheet 21.

The record sheets 19, 20 and 21 have superimposed delivery stubs 25, 26 and 27 that are detachably connected to the body of the sheet by tear lines 28. Each of the stubs 25 has a space 29 in which the delivery address may be written, and is also provided with spaces 30, 31 and 32 to receive notations indicating whether the order is a charge or a C. O. D. and the amount of money due on delivery.

The bottom group of sheets includes transfer sheets 33 and 34 which are interposed between the record sheets 19 and 20 and 20 and 21. The transfer sheets 33 and 34 are bound to the stubs 8 of the record sheets and extend past the tear lines 28 into manifolding relation with superimposed stubs 25, 26 and 27, so that notations made in the spaces 28, 30 and 31 may be duplicated on the stubs 26 and 27.

Figure 4:
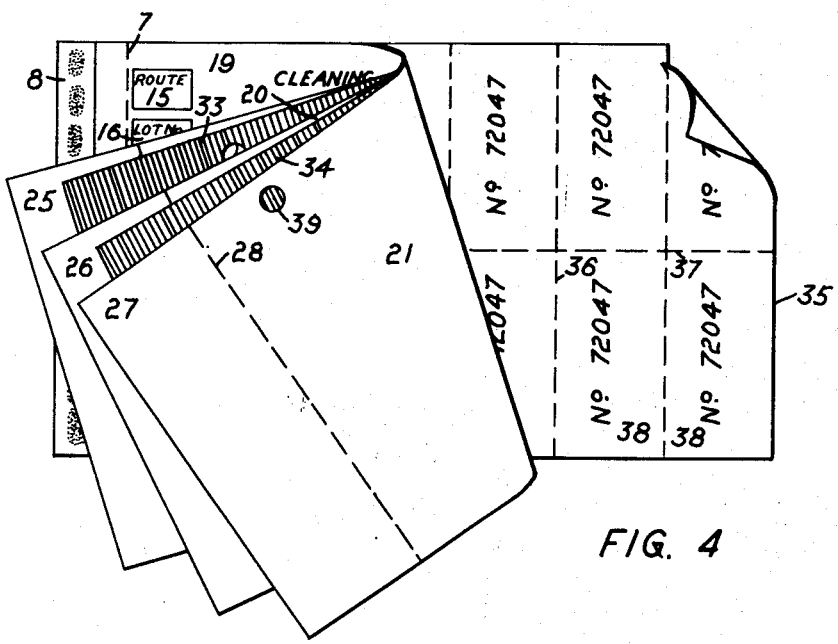
Fig. 4 is a plan view of the bottom group of sheets partly turned back to show the backing sheet that is provided with crossing tear lines to provide a series of article identifying tags.

As shown in Fig. 4, the manifolding set is preferably provided with a backing sheet 35 which is divided by transverse and longitudinal tear lines 36 and 37 to provide a series of identical tags 38 which may be attached to the individual articles to be processed to identify them.

The manifolding set may be punched to provide registering holes 39 in the sheets to receive retaining pins of files in which parts of the set may be placed.

In using the manifolding set of the present invention, the salesman who collects the articles to be processed writes the name and address of the customer in space 9 and the delivery address if different from the customer's address in space 10, itemizes the articles in space 11, makes the necessary notations in spaces 12 and 13, writes the receiving date in space 13, and indicates the route number, lot number and promised delivery date in spaces 15, 16 and 17. The salesman then detaches the receipt stub 18 and leaves the same with the customer.

Upon delivery of the articles to the shop one of the tags 38 is attached to each of the articles to be processed and the manifolding set is then delivered to the credit department to verify any notation as to charge and to make the necessary entries in space 14. The top group of sheets is then detached from the bottom group, the top group of sheets being retained in the office and the the bottom group of sheets being sent to the production department. The record sheet 3 is detached from the top group and sent to the delivery department so that the shipping clerk may have a file that provides a record of articles being processed and that shows the promised delivery date of each article so that he can make the proper inquiries whenever there is undue delay in connection with the processing of any article. The record sheets 1 and 2 remain in the office so that final entires showing the date or dates of delivery and payments received may be made before the master record sheet is placed in the permanent file.

In the case of a charge account, the duplicate record sheet 2 showing the entire transaction including deliveries can be mailed to the customer with his bill. In the case of C. O. D. orders, the duplicate record sheet 2 is usually discarded.

In the production department the bottom group of record and transfer sheets provides a convenient check on articles which are being processed and which await processing, and the individual record sheets 19, 20 and 21 with their attached stubs are attached to the articles listed in spaces A, B and C respectively after such articles have been processed.

Each of the record sheets and each of the stubs associated with the record sheets of each manifolding set has the same identifying number imprinted thereon. In Figs. 1 to 4 inclusive the number 72047 is shown upon each of the record sheets, upon the receipt stub, and upon each of the delivery stubs, and also upon each of the identifying tags 38.

The record sheet 19 of the bottom group upon which is imprinted the items recorded in space A only, is attached to the garments or assembly of garments indicated in space A, and this record sheet and also its attached stub 25 have the letter A imprinted thereon to identify the item or items with which the record sheet 19 is to be associated and to identify the stub as being originally associated with the record sheet 19. The record sheet 20 and stub 26 have the letter B imprinted thereon, and the record sheet 21 and stub 27 have the letter C imprinted thereon.

If items listed in spaces A, B and C are to be processed in different departments of the plant, the record sheets 19, 20 and 21 which are identified by the letters A, B, and C are separated and delivered to the departments in which the items A, B and C are being processed. After the articles have been processed, they are delivered to the shipping department with the proper record sheet attached thereto.

If part of an order, for example, a man's suit recorded in one of the spaces A, B or C is finished before other articles included in the order, this suit with its associated record sheet and attached stub may be sent to the delivery department for delivery ahead of the other items listed in the order.

The delivery address may be written on the stub 25 and duplicated on the stubs 26 and 27 at any time after detachment of the receipt stub 18. The proper charge or C. O. D. notation is made at the time the set passes through the credit department and the amount of money due may be written in at the time the stub is detached prior to delivery.

When the articles are taken for delivery, the stubs taken from the record sheets pinned to the articles are retained by the shipping clerk, who thus has a record of the articles in possession of each of the delivery men, and of the amount of money which should be collected by each of the delivery men.

In the case of a charge the delivery stubs are returned to the main office immediately after the goods have been turned over to the delivery men. In the case of C. O. D. deliveries, the stubs are returned to the main office after cash settlement has been made by the delivery man.

Upon receipt of the delivery stubs in the main office, the date of delivery and any other necessary entries are made on the master record sheet which is then taken from the temporary file and placed in the permanent file to provide a permanent record of the transaction.

The manifolding set of the present invention saves paper work and reduces bookkeeping errors, its use reduces losses due to misplacement of articles, provides a convenient means for keeping track of individual jobs so that failures to meet promised dates are greatly reduced, provides an effective check on charges and cash collections, and provides a convenient means for ascertaining the amount of work on hand at any time in various departments so that the operation of each department may be efficiently regulated.

The master record sheets provide a complete record of each job and the duplicate copies of the master record sheets in the shipping clerk's file provide a complete record of all jobs being processed, which can easily be checked to discover any undue delays.

The record sheets in the various departments provide a complete record of all work on hand in each department and also serve to prevent confusion due to separation of articles included in a single job for processing in different departments.

The delivery stubs provide a record of cash collections to be made by each delivery man and also provide a convenient means for insuring the prompt transfer of the master record sheets to the permanent file after the deliveries have been completed.

In Figs. 5 and 6 of the drawing a manifolding set of slightly different construction is shown. This manifolding set includes a detachable top group of record and transfer sheets which may be identical with the top group of sheets provided in the modification first described, the top group comprising record sheets 40, 41 and 42 and transfer sheets 43, 44 and 45, a receipt stub 46 similar to the stub 18 being provided on the master record sheet 40. The bottom group of sheets includes record sheets 47, 48 and 49 and interposed transfer sheets 50 and 51. Both the record and transfer sheets of the bottom group are longer than the transfer sheets in the modification first described, and the record sheets are provided with two transverse tear lines 52 and 53 to provide two identical stubs 54 and 55. The transfer sheets 50 and 51 extend past both tear lines 52 and 53 into manifolding relation with both sets of superimposed stubs.

As in the modification first described sheets of the bottom group are identified by the letters A, B and C and the two stubs forming a part of each of these record sheets have the same identifying letter imprinted thereon. The form shown in Figs. 5 and 6 is used in the same way as the form previously described, except that when the articles are taken by the delivery man the two stubs 54 and 55 are detached, one of the two stubs being retained by the shipping clerk as a check on the delivery man and for return to the main office to clear the files, and the second stub being retained by the driver for his convenience in routing his deliveries and in keeping track of the cash for which he must account.

It is to be understood that in accordance with the provisions of the patent statutes, variations and modifications of the specific devices herein shown and described may be made without departing from the spirit of the invention.

What I claim is:

1. A repair service manifolding set comprising a top group of sheets and a bottom group of sheets, the sheets of each group being bound together at one end of the set and the top group being detachable from the bottom, the said sheets comprising record sheets and transfer sheets superimposed in manifolding relation, the sheets of the bottom group being longer than the transfer sheets of the top group and record sheets thereof having superimposed detachable stubs at their free ends disposed beyond the ends of the transfer sheets of the top group, the transfer sheets of the bottom group having end portions disposed between said superimposed stubs.

2. A repair service manifolding set comprising a top group of sheets and a bottom group of sheets, the sheets of each group being bound together at one end of the set and the top group being detachable from the bottom, the said sheets comprising record sheets and transfer sheets superimposed in manifolding relation, one of the record sheets of the top group having a detachable receipt stub at its free end that is disposed beyond the free ends of the transfer sheets of the top group, the record sheets of the bottom group having superimposed detachable delivery record stubs also beyond the free ends of the transfer sheets of the top group, the transfer sheets of the bottom group being longer than the transfer sheets of the top group and extending between said superimposed stubs.

3. A repair service manifolding set comprising a top group of sheets and a bottom group of sheets, each group composed of record sheets and transfer sheets superimposed in manifolding relation, the sheets of each group being joined together at one end and each record sheet having a tear line adjacent its attached end providing a detachable stub joined to the transfer sheets, said top group including a master record sheet at the top and a transfer sheet at the bottom which is detachably connected to the stub of the top record sheet of the bottom group to permit removal of the top group as a unit from the bottom group, the record sheets of the bottom group being longer than the transfer sheets of the top group and each having two detachable delivery record stubs beyond the free ends of the transfer sheets of the top group, the stubs being superimposed and the transfer sheets of the bottom group being longer than the transfer sheets of the top group and extending between the said superimposed stubs.

ROY H. DICKSON.

References Cited in the file of this patent

UNITED STATES PATENTS

| Number | Name | Date |
|---|---|---|
| 1,157,142 | Barber | Oct. 19, 1915 |
| 1,637,156 | Mirski | July 26, 1927 |
| 2,092,127 | Lankton | Sept. 7, 1937 |
| 2,310,394 | Case | Feb. 9, 1943 |
| 2,581,895 | Wilson | Jan. 8, 1952 |

FOREIGN PATENTS

| Number | Country | Date |
|---|---|---|
| 514,173 | Great Britain | Nov. 1, 1939 |